United States Patent
Zhou

(10) Patent No.: US 7,778,813 B2
(45) Date of Patent: Aug. 17, 2010

(54) VIDEO CODING QUANTIZATION

(75) Inventor: Minhua Zhou, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 735 days.

(21) Appl. No.: 10/917,981

(22) Filed: Aug. 13, 2004

(65) Prior Publication Data

US 2005/0036545 A1 Feb. 17, 2005

Related U.S. Application Data

(60) Provisional application No. 60/495,488, filed on Aug. 15, 2003.

(51) Int. Cl.
*G06F 17/50* (2006.01)

(52) U.S. Cl. ...................................................... 703/15

(58) Field of Classification Search .................. 703/10, 703/15; 375/240.02–240.07
See application file for complete search history.

(56) References Cited

U.S. PATENT DOCUMENTS

| | | | | | |
|---|---|---|---|---|---|
| 5,253,054 | A | * | 10/1993 | Fujiwara et al. | 375/240.23 |
| 5,731,837 | A | * | 3/1998 | Hurst, Jr. | 375/240.03 |
| 5,896,176 | A | * | 4/1999 | Das et al. | 375/240.15 |
| 6,037,985 | A | * | 3/2000 | Wong | 375/240.03 |
| 6,504,495 | B1 | * | 1/2003 | Symes et al. | 341/95 |
| 7,197,072 | B1 | * | 3/2007 | Hsu et al. | 375/240.02 |
| 2002/0181583 | A1 | * | 12/2002 | Corbera | 375/240.03 |

\* cited by examiner

*Primary Examiner*—Dwin M Craig
(74) *Attorney, Agent, or Firm*—Mima Abyad; Wade J. Brady, III; Frederick J. Telecky, Jr.

(57) ABSTRACT

Modify H.263-type quantization with an adaptive quantization parameter floor; this limits clipping of quantized DCT coefficients and consequent artifacts. The maximum absolute level of AC coefficients of a DCT transformed macroblock provides a minimum quantization parameter from integer division by 256 when the quantized levels are clipped to a range such as −127 to +127.

5 Claims, 1 Drawing Sheet

VIDEO CODING QUANTIZATION

CROSS-REFERENCE TO RELATED APPLICATIONS

The present application claims priority from provisional patent application No. 60/495,488, filed Aug. 15, 2003.

BACKGROUND

The present invention relates to video coding, and more particularly to block-based video coding such as H.263.

Various applications for digital video communication and storage exist, and corresponding international standards have been and are continuing to be developed. Low bit rate communications, such as, video telephony and conferencing, led to the H.261 standard with bit rates as multiples of 64 kbps. Demand for even lower bit rates resulted in the H.263 standard.

As with other DCT-based video compression standards (H.261, MPEG1, MPEG2, MPEG4), H.263 decomposes a picture into a macroblocks where each macroblock contains four 8×8 luminance blocks plus two 8×8 chrominance blocks. With input 8-bit integer pixel values, conversion to luminance and chrominance pixel values in the range −256 to +255 (i.e., 9 bits).

FIG. 2 depicts the functional blocks of DCT-based video encoding. In order to reduce the bit-rate, 8×8 DCT is used to convert the 8×8 blocks (luminance and chrominance) into the frequency domain; the resulting DCT coefficients will have (rounded to integer) values in the range of −2048 to +2040 (i.e., 12 bits). Then, the 8×8 blocks of DCT-coefficients are quantized, scanned into a 1-D sequence, and coded by using variable length coding (VLC). For predictive coding in which motion compensation (MC) is involved, inverse-quantization and IDCT are needed for the feedback loop. Except for MC, all the function blocks in FIG. 2 operate on an 8×8 block basis. The rate-control unit in FIG. 2 is responsible for producing the quantization scale (qp) in the range 1 to 31 according to the target bit-rate and buffer-fullness to control the DCT-coefficients quantization unit. Indeed, a larger quantization scale implies more vanishing and/or smaller quantized coefficients which means fewer and/or shorter codewords.

There are two kinds of coded macroblocks. An INTRA-coded macroblock is coded independently of previous reference frames. In an INTER-coded macroblock, the motion compensated prediction block from the previous reference frame is first generated for each block (of the current macroblock), then the prediction error block (i.e. the difference block between current block and the prediction block) are encoded.

For INTRA-coded macroblocks, the first (0,0) coefficient in an INTRA-coded 8×8 DCT block is called the DC coefficient, the rest of 63 DCT-coefficients in the block are AC coefficients; while for INTER-coded macroblocks, all 64 DCT-coefficients of an INTER-coded 8×8 DCT block are treated as AC coefficients. The DC coefficients are quantized with a fixed value of the quantization parameter: qp=8, whereas the AC coefficients have quantization parameter levels adjusted according to the bit rate control which compares bit used so far in the encoding of a picture to the allocated number of bits to be used.

The process of H.263 quantization and inverse-quantization for AC coefficients is as in the following steps (pseudocode).

```
qp = quantization scale determined by rate control, and
constrained to the range [1:31];
Q = qp+qp;
if ((qp&0x1)==0) delta_q = qp−1;    // for qp even
else delta_q = qp;                   // for qp odd
``` where Q is the distance between quantization levels, and delta_q will be used to center an inverse quantization value in its quantization interval. This step is called once for each macroblock. Next,

```
sign      = level <0;         // level is the DCT coefficient
level_q   = abs(level);
level_q   = level_q/Q;        // the quantization: integer divide
if (level_q > 127) level_q = 127;   // clipping
```

H.263 DCT quantization operates on each AC coefficient of a macroblock. "level" is a not-yet-quantized AC coefficient, and "level_q" is the quantized AC coefficient which is clipped to the range [−127:127]. "sign" is non-zero for negative AC coefficients.

Then the inverse quantization:

```
level_iq = Q*level_q;
level_iq += delta_q;          // center in quantization interval
if (sign) level_iq = −level_iq;
if (level_iq <−2048) level_iq = −2048;
if (level_iq >2047) level_iq = 2047;
```

H.263 DCT inverse-quantization operates on each non-zero quantized AC coefficient of a macroblock. "level_iq" is the inverse quantization of "level_q" and clipped to the range [−2048:2047].

However, H.263 has a problem of blockiness for various types of video input.

SUMMARY OF THE INVENTION

The present invention provides a modification of quantization for video coding methods such as H.263 by providing a minimum quantization level to limit clipping.

This has advantages including reduced blockiness arising from clipping of quantized DCT coefficients.

DETAILED DESCRIPTION OF THE PREFERRED EMBODIMENTS

1. Overview

Figure 1:
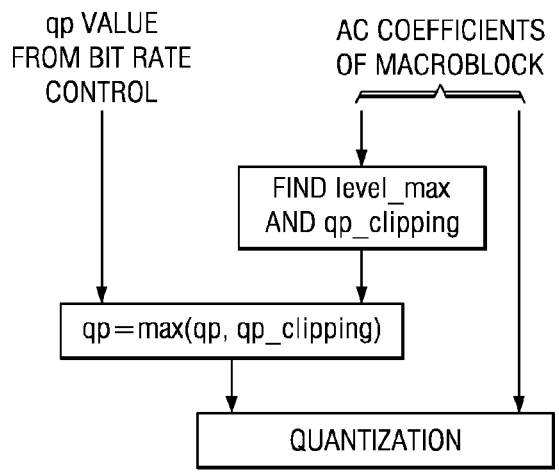
FIG. 1 is a flow diagram.
Figure 2:
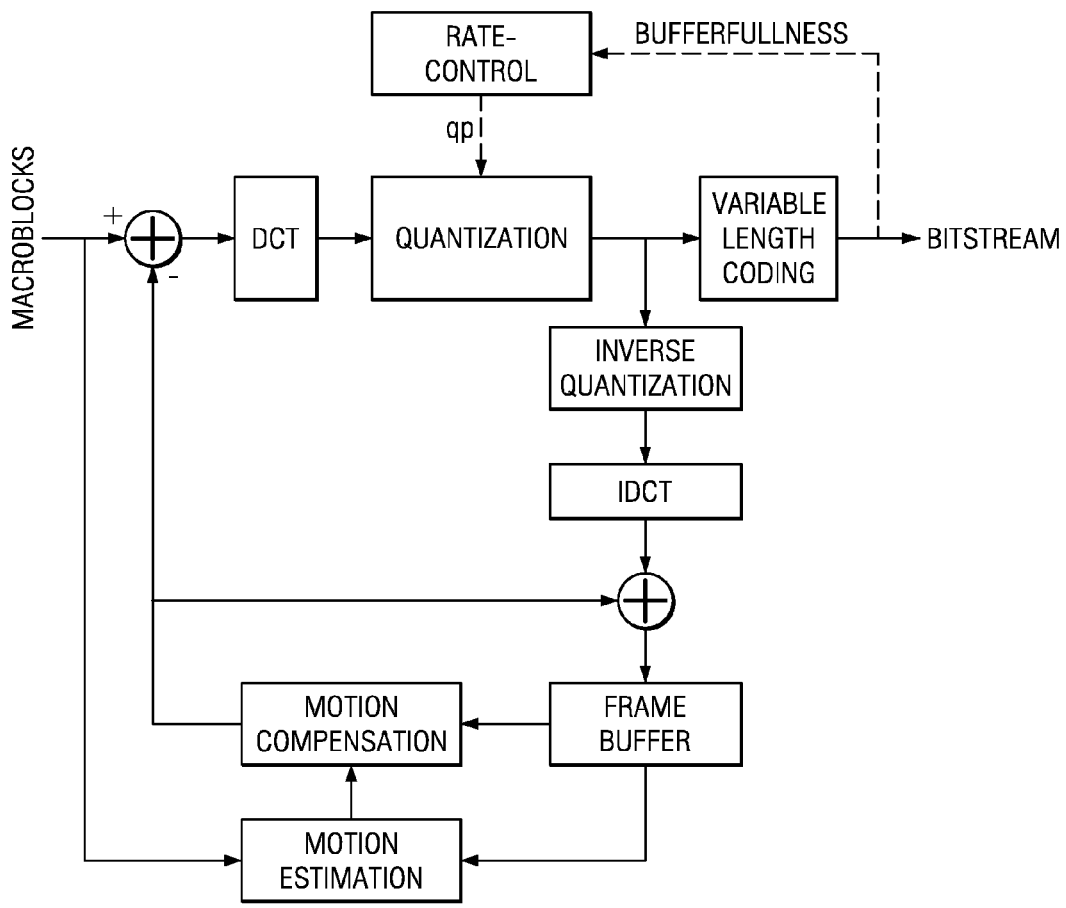
FIG. 2 illustrates functional blocks of an video encoder.

The preferred embodiment methods adapt H.263-type rate-controlled quantizer parameters by providing a minimum quantizer parameter for a block of coefficients being quantized to prevent clipping. FIG. 1 is a flow diagram. The same adaptive minimum quantizer parameter extends to other transform-type encoding which have clipping of transform coefficients to a range of values.

Preferred embodiment systems perform preferred embodiment methods with digital signal processors (DSPs) or general purpose programmable processors or application specific circuitry or systems on a chip (SoC) such as both a DSP and RISC processor on the same chip with the RISC processor controlling. In particular, digital still cameras (DSCs) with video clip capabilities could invoke the preferred embodiment methods. A stored program could be in an onboard ROM or external flash EEPROM for a DSP or programmable processor to perform the signal processing. Analog-to-digital converters and digital-to-analog converters provide coupling to the real world, and modulators and demodulators (plus antennas for air interfaces) provide coupling for transmission waveforms.

2. Adaptive Quantization Clipping

To avoid the quantization clipping problem, the preferred embodiment method of determination of the macroblock quantization scale considers both rate-control and clipping artifacts prevention.

In particular, in the quantization step of H.263, the quantized coefficient (level_q) is clipped to [−127:127]. However, this clipping step can lead to huge quantization errors for large-value AC-coefficients quantized with a small quantization scale qp (qp is in the range of [1:31]). In H.263 the pixel values input to the 8×8 DCT lie in the range [−255:255], so the DCT outputs (rounded to integer value) lie in the range [−2040:2040]. Therefore, in the worst case the maximum quantization error amounts to 1785 (i.e., qp=1, level=2040, level_q=127 after clipping, and thus level_iq=255 and the error=2040−255=1785).

In some cases, for example in cartoon films, the sequence to be encoded can have very simple picture content but with sharp edges. Because the picture content is sampled, the quantization scale determined by the rate-control can be down to qp=1 as long as the target bit-rate is relatively high. The blocks that contain edges will have large-value high frequency DCT-coefficients. After quantization and inverse quantization, the reconstructed values of those high-frequency coefficients are much smaller than the original ones, which produce annoying blocky artifacts along the edges. This kind of clipping artifact has been seen in Digital Still Camera (DSC) applications where H.263 is used for video clip capture.

To avoid such artifacts, the preferred embodiments provide a minimum qp to avoid clipping, qp_clipping, derived from the magnitudes of the AC coefficients of the macroblock being encoded. Explicitly, a first preferred embodiment AC coefficient quantization and inverse quantization includes the following steps (pseudocode) with clipping limitation in bold and the right shifting is for level_max expressed in binary:

```
qp = quantization scale determined by rate control, clipped to [1:31];
    level_max = maximum of the absolute values of the AC coefficients of a macroblock;
    qp_clipping = (level_max>>8);
    if (qp_clipping*256<level_max) qp_clipping++;
    if (qp<qp_clipping) qp = qp_clipping;
    Q = qp + qp;
    if ((qp&0x1)==0) delta_q = qp−1;
    else delta_q = qp;
    sign     = level <0;
    level_q  = abs(level);
    level_q  = level_q/Q;
    if (level_q > 127) level_q = 127
```

Inverse Quantization:

```
level_iq = Q*level_q;
level_iq += delta_q;
if (sign) level_iq = −level_iq;
if (level_iq <−2048) level_iq = −2048;
if (level_iq >2047) level_iq = 2047;
```

The minimum quantization scale "qp_clipping" that prevents clipping artifacts from happening is introduced in the encoding. To compute the "qp_clipping" for each macroblock, the maximum absolute value AC-coefficient "level_max" of the macroblock is first searched and obtained, then the qp_clipping is defined as $qp\_clipping=(level\_max>>8);$ if $(qp\_clipping*256<level\_max)$ $qp\_clipping++;$ Finally, the quantization scale qp produced by the rate-control is compared with qp_cliping, and if qp is less than qp_clipping, then qp is set to qp_clipping. The rest of quantization and inverse-quantization steps are unchanged. With this approach the maximum quantization error for AC-coefficients ranging from −2040 to +2040 is constrained to be less than 9. Therefore, it effectively prevents the clipping artifacts.

As a numerical example consider a macroblock which has a maximum magnitude AC coefficient, level, in the range 513 to 762, and presume that the bit rate control has provided a quantization parameter of qp=2. First, without a minimum qp_clipping, Q=4, delta_q=1, and level_q=level/Q is in the range 128 to 190. Then clipping to 127 makes level_q=127 for all values of level. Thus the inverse quantization, level_iq=127*Q+delta_q=127*4+1=509, is the same for all values of level. Thus the quantization/inverse-quantization has converted level in the range 513 to 762 into level_iq=509, a large change for all values of level away from the low end of its range.

In contrast, with level_max in the range 513 to 762, qp_clipping=3, and this modifies qp to yield qp=3, Q=6, delta_q=3, and so level_q=level/Q is in the range 85 to 127. Thus the clipping to 127 has no impact. Then the inverse quantization, level_iq=level_q*Q+delta_q=level_q*6+3, is in the range 513 to 765 and close the original value of level.

3. Modifications

The preferred embodiments can be modified while retaining the feature of a minimum quantization parameter to limit clipping.

For example, the clipping range [−127:127] could be replaced with another range, and the shifting of level_max would adapt. In particular, if level_q is clipped at $2^N-1$, then Q should be at least level_max>>N (i.e., $qp \geq level\_max>>(N+1)$ with equality when level_max is a multiple of $2^N$) in order to have level_max≅level_q*Q+delta_q when $level\_q \cong 2^N-1$.

Alternatively, qp_clipping could be defined as (level_max>>8)+1; this qp_clipping only differs from the preferred embodiment when level_max is a multiple of 256. Further, qp_clipping could use a level_max which is the average of the two or three largest AC coefficient magnitudes; this would lessen the impact of a single large AC coefficient.

What is claimed is:

1. An encoding method generating encoded video with motion compensation and block transformation, comprising:
   (a) transforming a block of pixel values to a block of coefficients;

(b) providing a quantization parameter;
(c) updating said quantization parameter based on rate control and clipping artifacts, with a minimum according to the magnitudes of said coefficients, said minimum includes a maximum magnitude of said coefficients of said block of coefficients shifted by the number of bits in a clipping level for said quantized coefficients, wherein the minimum quantization scale is based on a maximum AC coefficient; and
(d) quantizing said block of coefficients with said updated quantization parameter.

2. The method of claim 1, wherein:
(a) said maximum magnitude for said updating step (c) of claim 1 is a maximum absolute AC value of said block.

3. The method of claim 1, wherein:
(a) said providing a quantization parameter in step (b) of claim 1 derives from a rate control for video encoding with said block of values either pixels of an intra-coded block or motion-compensation residuals of an inter-coded block.

4. The method of claim 3, wherein:
(a) said video encoding conforms to H.263 or MPEG-4.

5. A non-transitory computer-readable storage medium with an executable instruction, wherein said executable instructions, when executed, instruct a microprocessor to perform an encoding method for determining quantization scale, comprising:
(a) transforming a block of pixel values to a block of coefficients;
(b) providing a quantization parameter;
(c) updating said quantization parameter based on rate control and clipping artifacts, with a minimum according to the magnitudes of said coefficients, said minimum includes a maximum magnitude of said coefficients of said block of coefficients shifted by the number of bits in a clipping level for said quantized coefficients, wherein the minimum quantization scale is based on a maximum AC coefficient; and
(d) quantizing said block of coefficients with said updated quantization parameter.

* * * * *